United States Patent [19]

Satoh et al.

[11] Patent Number: 4,758,538

[45] Date of Patent: Jul. 19, 1988

[54] FOAMED CERAMIC BODY AND PROCESS FOR PRODUCTION THEREOF

[75] Inventors: Shyuji Satoh, Ohmiya; Tadaoki Ogasawara, Urawa, both of Japan

[73] Assignee: Sekisui Kagaku Kogyo Kabushiki Kaisha, Osaka, Japan

[21] Appl. No.: 842,809

[22] Filed: Mar. 21, 1986

[30] Foreign Application Priority Data

Mar. 28, 1985 [JP] Japan ................... 60-64862
Sep. 10, 1985 [JP] Japan ................... 60-201091
Oct. 7, 1985 [JP] Japan ................... 60-223333

[51] Int. Cl.$^4$ .............................................. C04B 38/02
[52] U.S. Cl. ............................................. 501/84; 501/2; 501/39; 501/80
[58] Field of Search ..................... 501/84, 39, 80, 2

[56] References Cited

U.S. PATENT DOCUMENTS

| | | | |
|---|---|---|---|
| 3,887,671 | 6/1975 | Metzger | 501/84 |
| 4,261,938 | 4/1981 | Engström et al. | 501/84 |
| 4,430,108 | 2/1984 | Hojaji et al. | 501/39 |

FOREIGN PATENT DOCUMENTS

| | | | |
|---|---|---|---|
| 3314797 | 10/1984 | Fed. Rep. of Germany | |
| 38-26470 | 12/1963 | Japan | 501/84 |
| 4969705 | 7/1974 | Japan | 501/84 |

*Primary Examiner*—Steven Capella
*Attorney, Agent, or Firm*—Wenderoth, Lind & Ponack

[57] ABSTRACT

A foamed ceramic body comprising at least 90% by weight of a ceramic composed of 60 to 80% by weight of $SiO_2$, 5 to 15% by weight of $Al_2O_3$, 8 to 14% by weight of an alkali metal oxide, and 1 to 10% by weight of CaO; and a process for producing the said foamed ceramic body, which comprises mixing 100 parts by weight of a powdery mixture composed of 75 to 90% by weight of a volcanic material, 5 to 15% by weight of an alkali metal oxide or compound which forms an alkali metal oxide on heating and 2 to 10% by weight of CaO or a compound which forms CaO on heating, uniformly with 0.1 to 1 part by weight of a blowing agent, and heating the mixture to a temperature of 800° to 1100° C.

25 Claims, No Drawings

FOAMED CERAMIC BODY AND PROCESS FOR PRODUCTION THEREOF

BACKGROUND OF THE INVENTION

1. Field of the Invention

This invention relates to a foamed ceramic body comprising at least 90% by weight of a ceramic composed of $SiO_2$, $Al_2O_3$, an alkali metal oxide and CaO, and to a process for its production. The foamed ceramic body is suitable as a building material such as an exterior wall panel.

2. Description of the Prior Art

It is well known that foamed ceramic bodies have properties suitable for use as a building material, for example light weight, excellent thermal insulation and high durability. No technique, however, has yet been developed which can industrially produce foamed ceramic bodies of practical utility.

For the foamed ceramic bodies to have utility as fire-retardant or refractory building materials, they must meet certain requirements. Firstly, they must endure temperatures of 800° C., preferably 900° C. the fire preventing and resisting tests stipulated in JIS A1302-1975 and JIS A1304-1975. Secondly, they are required to be produced as a large-sized plate for practical purposes. Desirably, such a large-sized plate of ceramic foams is produced by heat-foaming on a plate or wire, or in a mold, of a heat-resistant metal such as stainless steel. In view of the heat resistance of the metallic material, the heat-foaming temperature should be not more than 1100° C., preferably not more than 1000° C. Thirdly, for commercial practice, they should be produced continuously. To achieve this, it is desirable that cracks and the like should not be caused by a difference in temperature between the surface portion and the inside portion of the heat-foamed plate even when its cooling is rapid.

The present inventors have reviewed and studied conventional foamed ceramic bodies, but have failed to find any which satisfies all of the above requirements.

For example, a formed inorganic body of a multilayer structure prepared from volcanic glass using varying amounts of a blowing agent (Japanese Laid-Open Patent Publication No. 22010/1977) and an inorganic material composed of a mixture of a slag and a silicic acid-containing substance (Japanese Laid-OPen Patent Publication No. 65716/1979) require heat-foaming temperatures of 1100° to 1300° C. which are outside the range mentioned above with regard to the second requirement.

An inorganic material composed of a mixture of "shirasu" which occurs in Kagoshima Prefecture of Japan, a slag and water glass (Japanese Laid-Open Patent Publication No. 35730/1978) contains a large amount of water glass so that its heat-foaming temperature can be lowered to about 1000° C. However, since sodium exudes to near the surface of the material, pores in the surface portion become large, and pores in the inside are small. It is impossible therefore to obtain a uniformly foamed product.

SUMMARY OF THE INVENTION

It is an object of this invention to provide a foamed ceramic body prepared at a heat-foaming temperature of 800° to 1100° C., and a process for its production.

Another object of this invention is to provide a foamed ceramic body containing uniformly distributed cells and having excellent mechanical strength, and a process for its production.

Still another object of this invention is to provide a foamed ceramic body in the form of a large plate, and a process for its production.

Yet another object of this invention is to provide a foamed ceramic body which does not undergo cracking, warping nor breaking even when its cooling after heat-foaming is relatively rapid, and a process for its production.

A further object of this invention is to provide a foamed ceramic body which can be produced industrially at low cost, and a process for its production.

The foamed ceramic body of this invention comprises at least 90% by weight of a ceramic composed of 60 to 80% by weight of $SiO_2$, 5 to 15% by weight of $Al_2O_3$, 8 to 14% by weight of an alkali metal oxide, and 1 to 10% by weight of CaO.

In a first aspect, the process of this invention comprises mixing 100 parts by weight of a powdery mixture of 75 to 90% by weight of a volcanic material, 5 to 15% by weight of an alkali metal oxide or compound which forms an alkali metal oxide on heating and 2 to 10% by weight of CaO or a compound which forms CaO on heating, uniformly with 0.1 to 1 part by weight of a blowing agent, and heating the resulting mixture to a temperature of 800° to 1100° C.

In a second aspect, the process of this invention comprises mixing 100 parts by weight of a powdery mixture of 40 to 80% by weight of a volcanic material, 5 to 15% by weight of an alkali metal oxide or compound which produces an alkali metal oxide on heating, 2 to 10% by weight of CaO or a compound which forms CaO on heating and 1 to 40% by weight of silica sand uniformly with 0.1 to 1 part by weight of a blowing agent, and heating the mixture to a temperature of 800° to 1100° C.

In a third aspect, the process of this invention comprises mixing 100 parts by weight of a powdery mixture of 40 to 80% by weight of a volanic material, 1 to 10% by weight of an alkali metal oxide or compound and 1 to 50% by weight of glass uniformly with 0.1 to 1 part by weight of a blowing agent, and heating the mixture to a temperature of 800° to 1100° C.

DETAILED DESCRIPTION OF THE INVENTION

In the ceramic used in this invention, the amount of $SiO_2$ is 60 to 80% by weight, preferably 64 to 75% by weight. If it exceeds 80% by weight, the foaming temperature required exceeds 1100° C., and the production of a large plate as one object of this invention becomes difficult. If it is less than 60% by weight, the coefficient of thermal expansion of the ceramic becomes high, and cracking or the like will occur during the cooling of the heat-foamed product owing to the temperature difference between the surface portion and the inside of the product.

The amount of $Al_2O_3$ in the ceramic is 5 to 15% by weight, preferably 7 to 14% by weight. If it exceeds 15% by weight, the content of $SiO_2$ decreases accordingly, and the aforesaid inconvenience arises. If it is less than 5% by weight, it is necessary to increase the content of the alkali metal oxide, and this is liable to cause cracking during cooling.

The amount of CaO is 1 to 10% by weight, preferably 2 to 7% by weight. If it exceeds 10% by weight, the heat-foaming temperature becomes high, and the foamed ceramic body obtained has a hard and brittle surface. If it is less than 1% by weight, the heat foaming temperature becomes high and a foamed ceramic body of good quality cannot be obtained.

The amount of the alkali metal oxide in the ceramic is 8 to 14% by weight, preferably 10 to 13% by weight. If it exceeds 14% by weight, cracking tends to occur during cooling of the foamed ceramic body. If it is less than 8% by weight, the foaming temperature becomes undesirably high.

The amounts in weight % of $Al_2O_3$, $SiO_2$, and CaO are values obtained by analyzing aluminum, silicon and calcium in the foamed ceramic body by the method of JIS R2212-1955.

The ceramic used in this invention may further contain compounds of Mg, Fe, Ti and Mn as other components in amounts of 10% by weight at most as compounds included in the volcanic materials, silica sand, glass and the alkali metal oxide or compound forming an alkali metal oxide on heating.

According to the first process for producing the foamed ceramic body of this invention, a powdery mixture composed of a volcanic material, an alkali metal oxide compound and CaO or compound which forms CaO on heating is uniformly mixed with a blowing agent, and the resulting mixture is heated to a temperature of 800° to 1100° C. In this process, the $SiO_2$ content of the volcanic materials should be at least 65% by weight. If it is more than 65% by weight, excellent mechanical properties suitable for building materials cannot be obtained. Examples of the volcanic materials are liparite, rhyolite such as "koukaseki" which occurs in Niijima island of Japan, granite and quartz trachyte, and "shirasu".

The second process for producing the foamed ceramic body of this invention comprises mixing a powdery mixture of a volcanic material, an alkali metal oxide or compound forming alkali metal oxide on heating and silica sand uniformly with a blowing agent, and heating the resulting mixture to a temperature of 800° to 1100° C. In this process, the $SiO_2$ content of the volcanic materials should be not more than 70% by weight. Since silica sand comprises at least 90% of $SiO_2$, the $SiO_2$ content of the volcanic material is preferably not more than 70% by weight in order to adjust the composition of the foamed ceramic body to the specified range. Since the use of silica sand enables volcanic materials of a low $SiO_2$ content to be used, the range of volcanic materials that can be used is broadened. Examples of preferred volcanic materials are diorite, gabbro, andesite and basalt.

The third process for producing the foamed ceramic body of this invention comprises mixing a powdery mixture of a volcanic eruption, an alkali metal oxide or compound which forms an alkali metal oxide on heating and glass uniformly with a blowing agent, and heating the resulting mixture to a temperature of 800° to 1100° C. In this process, the $SiO_2$ content of the volcanic eruptions should be at least 50% by weight. Those volcanic materials which have a low $SiO_2$ content such as gabbro and besalt are unsuitable but a broad range of other volcanic materials can be used. Glass has the advantage of decreasing the amount of the alkali metal oxide compound used and making it possible to produce the foamed ceramic body at low cost because it inherently contains $Na_2O$ and CaO.

Examples of the alkali metal oxide or compound forming an alkali metal oxide on heating that can be used in this invention are sodium oxide; sodium hydroxide, sodium carbonate and water glass which contains an $Na_2O$ component; and poassium carbonate and potassium hydroxide which contain a $K_2O$ component. These alkali metal compounds may be used singly or in combination.

Examples of the compound which forms CaO on heating that can be used in this invention include calcium hydroxide, calcium carbonate and calcium oxalate which contain a CaO component; and naturally occurring materials such as limestone, lime and slaked lime.

In the present invention, a clay may be added in an amount of up to 15% by weight, preferably 1 to 10% by weight based on the powdering mixture, but the total weight of the clay and volcanic material should not exceed the upper limit of the amount of the volcanic material specified above. The incorporation of the clay increases the melt viscosity of the mixture and contributes to the production of a foamed ceramic body having a good fine cellular structure. If the amount of the clay exceeds 15%, the heat-foaming temperature required rises and the heat-foamed product has a high shrinkage. Examples of the clay are bentonite, terra alba, flyash and kaolin. They may be used either singly or in combination.

It is also possible to incorporate a $B_2O_3$ compound in an amount of 7% by weight at most, preferably 1 to 7% by weight based on the weight of the powdering mixture. The total amount of the $B_2O_3$ compound and the alkali metal oxide compound should not exceed the upper limit of the amount of the alkali metal oxide compound specified above. The $B_2O_3$ compound serves to reduce the cellular size of the foamed ceramic body and also renders the foamed ceramic body invulnerable to breaking because the coefficient of thermal expansion of the $B_2O_3$ compound is not so high as that of the alkali metal oxide compound. If the amount of the $B_2O_3$ compound is too large, the cellular size of the foamed ceramic body becomes large, and its mechanical strength is reduced. If it is too small, it cannot fully exhibit an effect of reducing the cellular size of the foamed body. Examples of the $B_2O_3$ compound include boron oxide, boric acid and borates such as sodium borate. It is available as a naturally occurring material such as borax, urexite and colemanite.

Calcium phosphate may also be incorporated in the foamed ceramic body of this invention in an amount of up to 5% by weight, preferably 0.5 to 5% by weight based on the weight of the powdery mixture. The total amount of calcium phosphate and the CaO compound should not exceed the upper limit of the amount of the CaO compound specified above. Calcium phosphate serves to reduce the cellular size of the foamed ceramic body and increase its mechanical strength. If the amount of calcium phosphate is too large, it is difficult to obtain a foamed ceramic body having a high expansion ratio and its mechanical strength is reduced. If it is too small, calcium phosphate does not fully exhibit an effect of reducing the cellular size of the foamed ceramic body. Calcium phosphate used in this invention is desirably a normal salt. With the acid salt, it is difficult to obtain a foamed ceramic body having a fine cellular size and high mechanical strength.

It is also possible to incorporate talc in the foamed ceramic body of this invention in an amount of up to 5% by weight at most, preferably 2 to 5% by weight. The total amount of talc and the CaO or compound forming CaO on heating should not exceed the upper limit of the amount of the CaO compound specified above. Talc, like the CaO compound, serves to lower the melting point of the molten ceramic and to give a foamed ceramic body having lower hardness and being less vulnerable to breaking than in the case of using the CaO compound.

In the processes of this invention, 100 parts of the powdery mixture comprising a volcanic materials, alkali metal oxide compound, etc. is mixed uniformly with 0.1 to 1 part by weight, preferably 0.1 to 0.6 part by weight, of a blowing agent based on the powdery mixture. Smaller amounts of the blowing agent give lower expansion ratios. If the amount of the blowing agent is less than 0.1 part by weight, the resulting foamed body is not suitable for use as a building material. Amounts larger than 1 part by weight do not produce a greater effect, and only add to the cost of production. Examples of the blowing agent include silicon carbide, silicon nitride, boron nitride, carbon black, and carbonates such as sodium carbonate, calcium carbonate, magnesium carbonate and dolomite.

The volcanic material, alkali metal oxide compound, CaO or compound forming same on heating, glass, silica sand, clay, $B_2O_3$ compound, calcium phosphate, talc, blowing agent and other components are preferably used as a powder having a size passing preferably 200 mesh.

The starting ceramic mixture comprising the volcanic material and the other components may be heat-foamed as a powder. If desired, prior to heat-foaming, the mixture may be granulated by a granulator or compressed into a desired shape.

The heat-foaming temperature used in the processes of this invention is 800° to 1100° C., preferably 900° to 1000° C.

The addition of the $Na_2O$ compound and the CaO compound serves to lower the heat-foaming temperature required for the starting ceramic mixture. These compounds cooperatively lower the melting and softening temperatures of the volcanic material as a main component. The starting mixture is melted and foamed at a temperature of 800° to 1100° C. only when its composition is as specified hereinabove. If the proportion of the $Na_2O$ compound is too large, the resulting foamed ceramic body has a large cellular size and cracking occurs in it during cooling after the heat-foaming. If the proportion of the $Na_2O$ compound is too small, it is difficult to lower the melting and softening temperature of the starting mixture. The $Na_2O$ compound alone does not so much lower the melting temperature, but the use of it together with the CaO compound synergistically lower the melting temperature. This synergistic effect cannot be produced if the amount of the CaO compound is outside the range specified.

According to this invention, the starting mixture is heat-foamed in an electrical furnace, a rotary furnace, a tunnel furnace or the like. During heat-foaming, a metallic wire or wire gauze may be embedded in the starting mixture for reinforcement. Alternatively, a jig may be embedded in it.

The foamed ceramic body can be continuously produced by placing the starting mixture in the form of a powder, granules or a shaped article on an endless belt passing through the furnace, heat-foaming it while it passes through the furnace, optionally compression molding it into a suitable shape by rolls, etc. while it is still deformable, and thereafter gradually cooling it and allowing it to come out of the furnace. One suitable endless belt is a belt of aggregated balance type composed of wires arranged with small gaps therebetween to avoid dropping of the powder or molten material. An alumina powder or an alumina hydroxide powder may be coated on the belt to prevent adhesion of the molten material.

It is also possible to place the starting mixture in the form of a powder, granules or a shaped article in a mold coated with an alumina powder, etc., heat-foaming it while it passes through a tunnel furnace, forming it by a press while it is still deformable, and thereafter gradually cooling the shaped product.

The starting compounds in powder form are uniformly mixed, and the mixture is melted and softened at a temperature of 800° to 1100° C. in the heating furnace while reacting. When the mixture has attained a suitable viscosity, the blowing agent decomposes and cellulates the mixture. The presence of the $Na_2O$ compound and the CaO compound serves to limit the melting and softening temperature of he mixture to the aforesaid range, and the presence of the $B_2O_3$ compound or calcium phosphate gives a foamed product having a uniform small cellular size and high mechanical strength.

Furthermore, the presence of the clay increases the melt viscosity of the molten mixture and gives a foamed product having a uniform cellular size.

Since the heat-foaming temperature is 900° to 1100° C., the foamed ceramic body of this invention is suitable for use as a fire preventing material or a refractory material, and a large foamed plate can be very easily produced. Furthermore, since the coefficient of thermal expansion of ceramics as the reaction product can be minimized in accordance with this invention, no cracking due to the temperature difference between the surface portion and the inside portion occurs during cooling after heating. The present invention enables industrial production without using a heating furnace of high performance. Furthermore, the heating and cooling times are shortened, and the cost of energy is reduced. The production efficiency increases, and the cost of production is reduced. Since the foamed ceramic body has a small uniform cellular size, it also has high mechanical strength.

The foamed ceramic body obtained by this invention can be used in a plate form as such a building material as an exterior wall panel, a roofing material or a floor material, or in the form of a compressed article obtained in a mold, as roof tiles, tiles and a fence material.

The following examples illustrate the present invention more specifically.

In the following examples, the flexural strength and compressive strength were measured in accordance with the methods described in JIS R5201-1981.

EXAMPLE 1

"Koukaseki" was crushed by a ball mill to form a fine powder of "koukaseki" having a size passing 300 mesh under. The resulting fine powder (77 kg), 10 kg of soda ash powder, 3 kg of slaked lime powder, 10 kg of bentonite powder and 300 g of silicon carbide powder were uniformly mixed in a cross rotary-type powder mixer.

A dispersion of alumina powder in water was coated on the surface of a stainless steel plate (2 m long, 1.2 m wide, and 2 mm thick), and dried to form an aluminum coating. The above mixture was uniformly placed on the alumina coating of the plate to a thickness of about 5 cm. The stainless steel plate was then placed in a furnace and heated to 970° C. in 1 hour. The mixture began to melt and foam. It was maintained at 970° C. for 5 minutes and then cooled to 200° C. in about 3 hours to give a foamed ceramic body which was uniformly cellulated, was greenish white, and had a thickness of about 55 mm and a specific gravity of 0.7.

The ceramic body was cut, and the cut section was observed. It was found to contain nearly uniformly distributed cells with a maximum size of 1.5 mm.

EXAMPLE 2

Seventy-eight kilograms of a fine powder of "koukaseki" having a size passing 250 mesh, 7 kg of lime stone powder, 3 kg of kaolin powder and 250 g of silicon carbide powder were mixed as in Example 1. The mixture was placed to a thickness of 2 cm on an aggregate balancetype endless belt made of stainless steel wires and coated with aluminum hydroxide. The belt was passed through a furnace at a maximum temperature of 950° C. When the maximum temperature was substantially reached, the mixture began to foam. Thereafter, the foamed molten mixture was molded into a plate by a roll while it is still in the softened state. The plate was then gradually cooled. The total time required for the mixture to pass through the heating furnace was about 2 hours.

There was obtained a foamed ceramic body having a specific gravity of about 0.6 and being pale green and containing uniformly distributed cells having a diameter of about 1 mm when its cut section was examined.

EXAMPLE 3

A fine powder of "shirasu" having a size passing 300 mesh (870 g), 100 g of soda ash powder, 30 g of slaked lime powder, 3 g of silicon carbide powder and 50 g of water were uniformly mixed. The mixture was molded into a tile form by a press. The tile was fully dried, and placed in a stainless steel mold which was in a tile form slightly larger than the above tile and of which inner surface was coated with alumina powder. The mold was heated in a heating furnace at 900° C. for 10 minutes to melt and cellulate the tile product. Immediately then, it was pressed by a tile-shaped plate and gradually cooled. The foamed ceramic body was taken out of the mold. It was a greenish white tile-like product which had a specific gravity of 0.45 and contained uniformly distributed cells having a maximum size of 1.5 mm when its cut section was examined.

EXAMPLE 4

"Shirasu" having a size passing 300 mesh (870 g), 100 g of soda ash powder, 30 g of slaked lime, 4 g of silicon carbide powder and 50 g of water were worked up in the same way as in Example 3, except that the heating temperature was changed to 950° C. There was obtained a tile-like product which was cream-like in color, had a specific gravity of 0.45, and contained uniformly distributed cells having a maximum diameter of 1.5 mm when its cut section was examined.

EXAMPLE 5

A powder of "koukaseki" having a size passing 300 mesh (83 parts by weight), 9 parts by weight of soda ash, 5 parts by weight of slaked lime, 3 parts by weight of ulexite and 0.25 part by weight of silicon carbide were mixed substantially uniformly. The mixture was placed in an electric furnace, heated to 970° C. in about 30 minutes, and maintaind at 970° C. for about 10 hours. Thereafter, it was cooled to 200° C. in about 2 hours, and taken out of the furnace.

The resulting foamed ceramic body had a specific gravity of 0.65, a flexural strength of 40 kg/cm$^2$ and a compressive strength of 110 kg/cm$^2$.

The foamed ceramic body was cut, and the cut section was examined. It was found that cells having a diameter of about 2 mm were uniformly distributed in it.

EXAMPLE 6

"Shirasu" having a size passing 250 mesh (88 parts by weight), 81 parts of soda ash, 21 parts by weight of slaked lime, 2 parts by weight of colemanite and 0.35 part by weight of silicon nitride were uniformly mixed, and 20 parts by weight of water was added to 100 parts of the resulting mixture. They were well kneaded, and then pelletized to a diameter of about 1 mm by an extrusion granulator. The pellets were then fully dried. The pellets were put in a furnace and heated to 970° C. to obtain a foamed ceramic body having a specific gravity of 0.4, a flexural strength of 23 kg/cm$^2$ and a compressive strength of 60 kg/cm$^2$. The foamed ceramic body was cut, and the cut section was examined. It was found that cells having a diameter of about 2.5 mm were uniformly distributed in it.

EXAMPLE 7

A powder of "koukaseki" having a size passing 300 mesh (84 parts by weight), 10 parts by weight of soda ash, 4 parts by weight of slaked lime, 2 parts by weight of calcium phosphate, and 0.25 part of silicon carbide were substantially uniformly mixed. The powdery mixture was then placed in a nearly uniform thickness on an endless belt passing through a heating furnace. It was heated to 960° C. while passing through the heating furnace to cellulate it. It was then gradually cooled to give a foamed ceramic body having a specific gravity of 0.6, a flexural strength of 40 kg/cm$^2$ and a compressive strength of 100 kg/cm$^2$. The foamed ceramic body was cut, and the cut section was examined. It was found that cells having a diameter of about 1 mm were distributed uniformly in it.

EXAMPLE 8

"Koukaseki" having a size passing 250 mesh (72 parts by weight), 14 parts by weight of soda ash, 7 parts by weight of lime stone, 5 parts by weight of bentonite, 2 parts by weight of calcium phospahte and 0.25 part by wight of silicon carbide were uniformly mixed, and kneaded with 25 parts by weight of water. The kneaded mixture was molded into a plate form, and fully dried. The dried plate was heated to 1000° C. in an electric furnace to give a foamed ceramic body having a specific gravity of 0.55, a flexural strength of 35 kg/cm$^2$ and a compressive strength of 75 kg/cm$^2$. The foamed ceramic body was cut, and its cut section was examined. It was found that cells having a diameter of about 0.5 mm were uniformly distributed.

COMPARATIVE EXAMPLE 1

A powder of andesite having a size passing 2500 mesh (83 parts by weight), 10 parts by weight of soda ash powder, 4 parts by weight of slaked lime, 3 parts by weight of calcium phosphate and 0.5 part by weight of silicon carbide powder were substantially uniformly mixed, and headed with 15 parts by weight of water. The kneaded mixture was granulated, fully dried and placed in a uniform thickness on a wire gauze. The wire gauze was put in an electric furnace, heated to 950° C. in about 30 minutes, and maintained at 950° C. for about 30 minutes. Thereafter, the heat-foamed product was cooled to 200° C. in about 2 hours and taken out of the furnace. A black foamed ceramic body having a specific gravity of 0.4 was obtained. It was cut, and the cut section was examined. It was found to contain cells having a diameter of about 7 mm.

The resulting ceramic body had a large cellular size and a poor appearance, and nonuniform strength.

EXAMPLE 9

A powder of "koukaseki" having a size passing 300 mesh (80 parts by weight), 11 parts by weight of soda ash, 3 parts by weight of ulexite, 6 parts by weight of talc and 0.25 part by weight of silicon carbide powder were substantially uniformly mixed, and put in an electric furnace. The mixture was heated to 950° C. in about 30 minutes, and maintained at 950° C. for about 10 minutes. Thereafter, it was cooled to 200° C. in about 2 hours, and taken out of the furnace. There was obtained a foamed ceramic body which was cream in color and had a specific gravity of 0.6. The ceramic body was cut, and the cut section was examined. It was found that cells having a maximum diameter of 1 mm were uniformly distributed in it.

EXAMPLE 10

A powder of "koukaseki" having a size passing 300 mesh (68 parts by weight), 5 parts by weight of soda ash, 5 parts by weight of bentonite, 25 parts by weight of glass powder having a size of 300 mesh under and 0.3 part by weight of silicon carbide powder were substantialy uniformly mixed. The mixture was put in an electric furnace, heated to 980° C. in about 30 minutes, and maintained at 980° C. for about 10 minutes. Thereafter, it was cooled to 200° C. in about 2 hours, and taken out of the furnace. There was obtained a foamed ceramic body which was cream in color and had a specific gravity of 0.55. It was cut, and the cut section was examined. It was found to contain cells having a maximum diameter of 2 mm uniformly distributed in it.

EXAMPLE 11

A powder of andesite having a size passing 300 mesh (52 parts by weight), 3 parts by weight of soda ash, 45 parts by weight of glass powder having a size of 300 mesh under and 0.3 part of silicon carbide power were substantially uniformly mixed. The mixture was put in an electric furnace, heated to 960° C. in about 30 minutes, and maintained at 960° C. for about 10 minutes. It was then cooled to 200° C. in about 2 hours, and taken out from the furnace. There was obtained a black foamed ceramic body having a specific gravity of 0.65. It was cut, and the cut section was examined. It was found to contain cells having a maximum diameter of 3 mm unifiormly distributed in it.

EXAMPLE 12

A powder of "shirasu" (60 parts by weight), 5 parts by weight of soda ash, 5 parts by weight of bentonite, 35 parts by weight of glass powder having a size passing 300 mesh and 0.3 part by weight of silicon carbide powder were substantially uniformly mixed. The mixture was put in an electric furnace, heated to 960° C. in about 30 minutes, and maintained at 960° C. for about 10 minutes. Thereafter, the heated mixture was cooled to 200° C. and taken out of the furnace. There was obtained a pale green foamed ceramic body having a specific gravity of 0.5. It was cut, and the cut section was examined. It was found to contain cells having a maximum diameter of 1 mm uniformly distributed in it.

COMPARATIVE EXAMPLE 2

A powder of "shirasu" having a size passing 300 mesh (25 pars by weight), 5 parts by weight of soda ash powder, 5 parts by weight of bentonite powder, 70 parts by weight of glass powder having a size of 300 mesh under and 0.3 part by weight of silicon carbide powder were substantialy uniformly mixed. The mixture was put in an electric furnace, heated to 970° C. in about 30 minutes, and maintained at 970° C. for about 10 minutes. It was then cooled to 200° C. in about 2 hours, and taken out of the furnace. There was obtained a foamed ceramic body which was cream in color and had a specific gravity of 0.53. It was cut, and the cut section was examined. It was found to contain cells having a maximum diameter of 1 mm uniformly distributed in it. Howver, this foamed ceramic body developed cracks during the coolilng, and also was brittle.

EXAMPLE 13

Andesite having a size passing 300 mesh (59 parts by weight), 28 parts by weight of silica sand, 10 parts by weight of soda ash, 3 parts by weight calcium phosphate and 0.25 part by weight of silicon carbide were substantially uniformly mixed. The mixture was placed in a substantially uniform thickness on an endless belt passing through a heating furnace, and heated at 970° C. for 20 minutes during passage through the heating furnace to cellulate it. Gradual cooling gave a foamed ceramic body having a specific gravity of 0.62, a flexural strength of 38 kg/cm$^2$, and a compressive strength of 125 kg/cm$^2$. It was cut, and the cut section was examined. It was found that cells having a diameter of 0.5 to 1 mm were uniformly distributed in it.

On analysis, the foamed ceramic body contained 68.0% of $SiO_2$, 11.0% of $Al_2O_3$, 6.3% of CaO, 10.0% of an alkali metal oxide and 1.5% of $P_2O_5$ as principal ingredients.

EXAMPLE 14

Andesite having a size passing 300 mesh (45 parts by weight), 15 parts by weight of silica sand, 5 parts by weight of soda ash, 30 parts by weight of sheet glass powder, 5 parts by weight of bentonite, and 0.3 part by weight of silicon carbide were substantially uniformly mixed, and fully kneaded with 10 parts by weight of water. The kneaded mixture was granulated by an extrusion granulator, and fully dried. The granules were placed in a substaantially uniform thickness on an endless bent passing through a heating furnace, and heated at 980° C. for 20 minutes to cellulate the granules. Gradual cooling gave a foamed ceramic body having a specific gravity of 0.53, a flexural strength of 30 kg/cm$^2$ and a compressive strength of 75 kg/cm$^2$. It was cut, and the cut section was examined. It was found that cells having a diameter of 0.3 to 0.7 mm were distributed uniformly and beautifully.

On analysis, the foamed ceramic body contained 70.1% of $SiO_2$, 9.3% of $Al_2O_3$, 5.8% of CaO and 10.3% of an alkali metal oxide as principal ingredients.

EXAMPLE 15

A foamed ceramic body was produced in the same way as in Example 14 except that 60 parts by weight of "shirasu" having a size passing 250 mesh, 15 parts by weight of silica sand, 11 parts by weight of soda ash, 5 parts by weight of lime stone and 0.3 part by weight of silicon carbide were used as starting materials.

The resulting foamed ceramic body had a specific gravity of 0.56, a flexural strength of 33 kg/cm$^2$ and a compressive strength of 85 kg/cm$^2$. It was cut, and the cut section was examined. It was found that cells having a diameter of 0.3 to 0.5 mm were uniformly distributed in it.

On analysis, it contained 71.6% of $SiO_2$, 9.2% of $Al_2O_3$, 5.0% of CaO and 10.9% of an alkali metal oxide as principal ingredients.

EXAMPLE 16

A foamed ceramic body was produced in the same way as in Example 14 except that 58 parts by weight of "shirasu" having a size passing 300 mesh, 25 parts by weight of silica sand, 11 parts by weight of soda ash, 3 parts by weight of slaked lime and 0.3 part by weight of silicon carbide were used as starting materials.

The resulting foamed ceramic body had a specific gravity of 0.58, a flexural strength of 35 kg/cm$^2$ and a compressive strength of 85 kg/cm$^2$. It was cut, and the cut section was examined. It was found that cells having a diameter of 0.3 to 0.5 mm were uniformly distributed in it.

On analysis, it contained 71.8% of $SiO_2$, 8.9% of $Al_2O_3$, 4.9% of CaO, 11.1% of an alkali metal oxide and 1.2% of $B_2O_3$ as principal ingredients.

EXAMPLE 17

A foamed ceramic body was produced in the same way as in Example 14 except that 30 parts by weight of basalt having a size passing 300 mesh, 26 parts by weight of silica sand, 9 parts by weight of soda ash, 10 parts by weight of bentonite and 0.2 part by weight of silicon carbide were used as starting materials.

The resulting foamed ceramic body had a specific gravity of 0.70, a flexural strength of 40 kg/cm$^2$ and a compressive strength of 140 kg/cm$^2$. It was cut, and the cut section was examined. It was found that cells having a diameter of 0.4 to 0.7 mm were uniformly distributed in it.

On analysis, it contained 71.6% of $SiO_2$, 9.2% of $Al_2O_3$, 5.0% of CaO and 10.9% of an alkali metal oxide as principal ingredients.

The analytical values of the foamed ceramic bodies obtained in the foregoing examples are shown in Table 1 below. The appearances of these foamed bodies are also shown in Table 1. The appearance was organoleptically evaluated by considering the uniformity of cellulation, cracking and warping and expressed by the following ratings.

◎ : excellent
○ : good
△ : fair
X : poor.

TABLE 1

| Example | $SiO_2$ | $Al_2O_3$ | $Na_2O + K_2O$ | CaO | Other compounds | Appearance |
|---|---|---|---|---|---|---|
| 1 | 71.9 | 11.6 | 11.1 | 3.3 | — | ◎ |
| 2 | 68.5 | 10.8 | 12.5 | 6.5 | — | ◎ |
| 3 | 65.3 | 13.3 | 12.0 | 4.7 | — | ○ |
| 4 | 64.9 | 13.2 | 11.9 | 5.3 | — | ○ |
| 5 | 69.7 | 10.9 | 11.0 | 5.2 | $B_2O_3$ 1.3 | ◎ |
| 6 | 65.2 | 13.2 | 10.7 | 4.9 | $B_2O_3$ 1.0 | ○ |
| 7 | 69.9 | 10.9 | 11.3 | 5.1 | $P_2O_5$ 1.9 | ○ |
| 8 | 65.5 | 10.4 | 13.6 | 7.6 | $P_2O_5$ 2.0 | △ |
| Comparative Example 1 | 50.5 | 14.4 | 11.8 | 11.4 | $P_2O_5$ 1.5 | X |
| Example 9 | 70.9 | 10.4 | 11.9 | 1.2 | $B_2O_3$ 1.3  MgO 2.0 | ○ |
| 10 | 74.7 | 9.3 | 10.6 | 2.7 | — | ◎ |
| 11 | 65.8 | 10.1 | 11.5 | 7.5 | — | ○ |
| 12 | 69.2 | 9.4 | 11.9 | 4.8 | — | ◎ |
| Comparative Example 2 | 73.8 | 5.0 | 11.4 | 5.7 | — | X |
| Example 13 | 68.0 | 11.0 | 10.0 | 6.3 | $P_2O_5$ 1.5 | ○ |
| 14 | 70.1 | 9.3 | 10.3 | 5.8 | — | ◎ |
| 15 | 71.6 | 9.2 | 10.9 | 5.0 | — | ◎ |
| 16 | 71.8 | 8.9 | 11.1 | 4.9 | $B_2O_3$ 1.2 | ◎ |
| 17 | 69.2 | 6.8 | 10.9 | 4.9 | — | ◎ |

What is claimed is:

1. A process for producing a foamed ceramic body, which coprises mixing 100 parts by weight of a powdery mixture composed of 75 to 90% by weight of a volcanic material containing at least 65% by weight of $SiO_2$, 5 to 15% by weight of at least one of $Na_2O$ or $K_2O$ or compound which forms $Na_2O$ or $K_2O$ on heating and 2 to 10% by weight of CaO or a compound which forms CaO on heating, uniformly with 0.1 to 1 part by weight of a blowing agent, and heating the resulting mixture to a temperature of 800° to 1100° C.

2. The process of claim 1 wherein the volcanic eruption contains at least 65% by weight of $SiO_2$.

3. The process of claim 1 or 2 wherein the volcanic materials is a volcanic rock and/or a volcanic ash.

4. The process of claim 1 wherein the compound which forms $Na_2O$ or $K_2O$ oxide on heating is at least one compound selected from the group consisting of sodium hydroxide, sodium carbonate, potassium carbonate and potassium hydroxide.

5. The process of claim 1 wherein the compound which forms CaO on heating is a compound containing at least one of calcium hydroxide, calcium carbonate.

6. The process of claim 1 or 5 wherein compound which forms CaO on heating is contained in limestone.

7. The process of claim 1 wherein the blowing agent is at least one compound selected from the group consisting of silicon carbide, silicon nitride, boron nitride, carbon black, sodium carbonate, calcium carbonate, magnesium carbonate, dolomite and water glass.

8. The process of claim 1 wherein the powdery mixture further contains up to 15% by weight of a clay, and the total amount of the clay and the volcanic material is 75 to 90% by weight all based on the weight of the powdery mixture.

9. The process of claim 1 wherein the powdery mixture further contains up to 7% by weight of a $B_2O_3$ compound, and the total amount of the $B_2O_3$ compound and at least one of $Na_2O$ or $K_2O$ is 5 to 15% by weight, all based on the weight of the powdery mixture.

10. The process of claim 1 wherein the powdery mixture further contains up to 5% by weight of calcium phosphate, and the total amount of calcium phosphate and the CaO compound is 2 to 10% by weight, all based on the weight of the powdery mixture.

11. The process of claim 1 wherein the powdery mixture further contains up to 5% by weight of talc, and the total amount of talc and the CaO or compound which forms CaO on heating is 2 to 10% by weight, all based on the weight of the powdery mixture.

12. The process of claim 1 wherein the powdery mixture has a particle diameter passing 200 mesh.

13. The process of claim 1 wherein the heating temperature is 900° to 1000° C.

14. A process for producing a foamed ceramic body which comprises mixing 100 parts by weight of a powdery mixture composed of 40 to 80% by weight of a volcanic material containing at most 70% by weight of $SiO_2$, 5 to 15% by weight of at least one of $Na_2O$ or $K_2O$ or compound which forms $Na_2O$ or $K_2O$ on heating, 2 to 10% by weight of CaO or compound which forms CaO on heating and 1 to 40% by weight of silica sand uniformly with 0.1 to 1 part by weight of a blowing agent, and heating the resulting mixture to a temperature of 800° to 100° C.

15. The process of claim 14 wherein the volcanic material contains not more than 70% by weight of $SiO_2$.

16. The process of claim 14 wherein the powdery mixture further contains up to 15% by weight of a clay, and the total amount of the clay and the volcanic material is 40 to 80% by weight, all based on the weight of the powdery mixture.

17. The process of claim 14 wherein the powdery mixture further comtains up to 7% by weight of a $B_2O_3$ compound, and the total amount of the $B_2O_3$ compound and at least one of $Na_2O$ or $K_2O$ compound is 5 to 15% by weight, all based on the weight of the powdery mixture.

18. The process of claim 14 wherein the powdery mixture further contains up to 5% by weight of calcium phosphate, and the total amount of calcium phosphate and the CaO or compound which forms CaO on heating is up to 10% by weight, all based on the weight of the powdery mixture.

19. The process of claim 14 wherein the powdery mixture further contains up to 5% by weight of talc, and the total amount of talc and the CaO or compound which forms CaO on heatng is up to 10% by weight.

20. The process of claim 14 wherein the powdery mixture has a particle diameter passing 200 mesh.

21. A proces for producing a foamed ceramic body, which comprises mixing 100 parts by weight of a powdery mixture composed of 40 to 80% by weight of a volcanic material contaiing at least 50% by weight of $SiO_2$, 1 to 10% by weight of at least one of $Na_2O$ or $K_2O$ or compound which forms $Na_2O$ or $K_2O$ on heating and 1 to 50% by weight of glass uniformly with 0.1 to 1 part by weight of a blowing agent, and heating the resulting mixture to a temperature of 800° to 1100° C.

22. The process of claim 21 wherein the volcanic material contains at least 50% by weight of $SiO_2$.

23. The process of claim 22 wherein the powdery mixture further contains up to 15% by weight of a clay, and the total amount of the clay and the volcanic materials is 40 to 80% by weight.

24. The process of claim 21 wherein the powdery mixture further contains up to 7% by weight of a $B_2O_3$ compound, and the total amount of the $B_2O_3$ compound and at least one of $Na_2O$ or $K_2O$ is 5 to 15% by weight, all based on the weight of the powdery mixture.

25. The process of claim 21 wherein the powdery mixture has a particle diameter passing 200 mesh.

* * * * *